United States Patent
Menzel et al.

(10) Patent No.: US 6,596,067 B2
(45) Date of Patent: Jul. 22, 2003

(54) COLORANT MIXTURE

(75) Inventors: Heidemarie Menzel, Bad Soden (DE); Josef Geisenberger, Sulzbach (DE); Andreas Wuzik, Erlensee (DE)

(73) Assignee: Clariant GmbH, Frankfurt (DE)

( * ) Notice: Subject to any disclaimer, the term of this patent is extended or adjusted under 35 U.S.C. 154(b) by 184 days.

(21) Appl. No.: 09/898,645

(22) Filed: Jul. 3, 2001

(65) Prior Publication Data

US 2002/0011179 A1 Jan. 31, 2002

(30) Foreign Application Priority Data

Jul. 5, 2000 (DE) .......................... 100 32 683

(51) Int. Cl.⁷ .................... C09D 11/02; C09B 1/00
(52) U.S. Cl. ........................ 106/31.51; 8/641
(58) Field of Search ............... 106/31.51; 8/641

(56) References Cited

U.S. PATENT DOCUMENTS

| | | | |
|---|---|---|---|
| 4,165,314 A | 8/1979 | Uehlinger | 8/639 |
| 4,554,555 A * | 11/1985 | Aruga et al. | 347/96 |
| 4,699,626 A | 10/1987 | von Tobel et al. | 8/549 |
| 4,785,083 A | 11/1988 | Zirngibl | 534/575 |
| 5,030,247 A | 7/1991 | Goldmann | 8/639 |
| 5,092,905 A | 3/1992 | Dore | 8/638 |
| 5,188,664 A | 2/1993 | Adamic et al. | 106/31.58 |
| 5,319,075 A | 6/1994 | Barra et al. | 534/684 |
| 5,560,771 A * | 10/1996 | Takemoto et al. | 106/31.49 |
| 5,665,871 A | 9/1997 | Pedrazzi | 534/573 |
| 5,747,566 A | 5/1998 | Weber | 524/93 |
| 5,756,691 A | 5/1998 | Weber et al. | 534/742 |
| 5,772,742 A * | 6/1998 | Wang | 106/31.27 |
| 6,320,031 B1 * | 11/2001 | Baettig et al. | 534/803 |
| 6,406,527 B1 | 6/2002 | Bauer et al. | 106/31.48 |
| 6,432,185 B1 | 8/2002 | Bauer et al. | 106/31.48 |
| 6,464,786 B1 | 10/2002 | Hopson | 118/500 |
| 6,469,147 B2 | 10/2002 | Nickel et al. | 534/582 |

FOREIGN PATENT DOCUMENTS

| | | |
|---|---|---|
| DE | 33 20 373 | 12/1983 |
| DE | 36 14 462 | 10/1986 |
| EP | 0 823 233 | 2/1998 |
| GB | 2 123 019 | 1/1984 |

OTHER PUBLICATIONS

English Abstract for DE 36 14 462, Oct./1986.
English Abstract for EP 0 823 233, Feb., 1998.

* cited by examiner

*Primary Examiner*—Helene Klemanski
(74) *Attorney, Agent, or Firm*—Anthony A. Bisulca

(57) ABSTRACT

A colorant mixture of C.I. Acid Red 289 and C.I. Reactive Red 23 and optionally a shading colorant is used for magenta recording fluids.

18 Claims, No Drawings

COLORANT MIXTURE

BACKGROUND OF THE INVENTION

This invention relates to the field of colorants, especially for use in recording fluids for writing and recording instruments, for example for ink-jet processes.

By ink-jet process is meant a recording system where droplets of ink are sprayed from a small nozzle onto a recording material, for example paper, under electronic control. The applied ink droplets adhered on the recording material and so depict the desired information. In practice, two methods are used today for generating and directing the ink droplets: the continuous stream process, in which a continuous spray of ink droplets is produced, the unneeded droplets being deflected into reservoir vessel for recycling, and the drop-on-demand process, where ink droplets are produced only when actually needed for writing. Generation of droplets may be effected by briefly raising the pressure, for example by means of a piezo crystal, in an ink chamber equipped with a small nozzle. There are also systems where the spray of ink droplets is produced by supplying thermal energy.

Regardless of the operating principle underlying an ink-jet recording system, the ink used has to meet certain requirements. The ink composition has to have carefully harmonized physical properties such as surface tension, viscosity and electrical conductivity to render it suitable for generating the droplets and controlling their direction of flight. Another important requirement is that the ink may not form any solids, even on evaporation of any constituent of the recording fluid or when the chemical composition of the ink changes during storage, during recording or during a recording pause. Furthermore, the image once recorded shall possess high water resistance, lightfastness and abrasion resistance (EP-A-0 823 233 and U.S. Pat. No. 5,188,664). Prior art inks, especially aqueous inks, however, have the disadvantage of tending to smudge on the recording material when they are moistened. A further disadvantage is that prior art inks usually fade quickly on exposure to light or mechanical abrasion.

Considering ink formulation requirements for multicolor printing, an additional problem is that the dyes used in the inks must correspond very exactly to the three color primaries yellow, magenta and cyan. The choice of suitable dyes is constrained not only by the hue needed, but also by the necessary cleanness of hue and the desire for brilliant color reproduction. Hitherto it has not been possible to develop an ink composition that possesses all the desired properties to the ideal degree and can be successfully used in commercial practice. Take magenta inks as an example. Conventional inks based on water-soluble magenta dyes utilize for example direct dyes, such as C.I. Direct Red 1, 11, 37, 62, 75, 81, 87, 89, 95 and 227. Inks prepared from direct dyes have excellent water resistance owing to the substantivity of direct dyes, but also two disadvantages: the nozzles tend to become clogged with precipitated dye during continuous printing or in intermittent use because of the low solubility in water. Secondly, aggregation is increasingly observed, which leads to dull hues and hence to unsatisfactory color reproduction.

On the other hand, the use of acidic dyes, for example C.I. Acid Red 1, 8, 52, 87, 94, 115, 131, 144, 152, 154, 186 and 245, has also been investigated, with the result that good color reproduction is indeed achieved, but the durability of the printed images is poor because of the low light and water resistance.

DE-A-3 614 462 and DE-A-3 320 373 disclose recording fluids which may contain reactive dyes. However, prints with water-soluble reactive dyes of the chlorotriazinyl or β-sulfatoethylsulfonyl type, however, usually do not possess optimal water resistance, an additional adverse effect being the formation of chloride or sulfate ions through hydrolysis of the reactive groups.

As well as dyes, ink-jet ink colorants also include highly lightfast pigments, for example C.I. Pigment Red 122, C.I. Pigment Red 176, C.I. Pigment Red 184, 185 or C.I. Pigment Red 269. The disadvantage is that the prints obtained lack brilliance.

There is consequently a need for improved recording fluids which are superior to prior art magenta inks especially in hue, storage stability and water resistance and also have the other properties required for the ink-jet art.

SUMMARY OF THE INVENTION

It has been found that, surprisingly, the stated requirements are met on using the hereinbelow defined water-soluble dyes of the formulae (1) and (2) as mixtures.

The present invention provides a dye mixture consisting essentially of C.I. Acid Red 289 of the formula (1) and a compound of the formula (2) in a weight ratio of 1:100 to 100:1, based on dry weights,

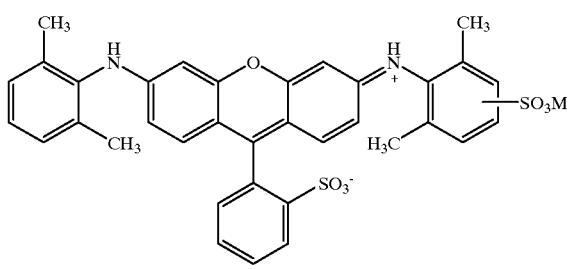

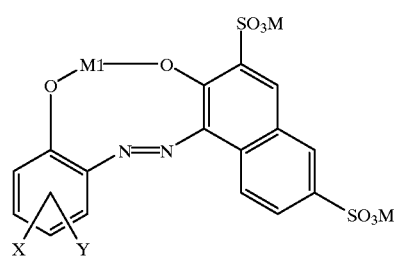

where x is $SO_2R^1$,

Y is H, alkyl, alkoxy, preferably H, $(C_1-C_4)$-alkyl, $(C_1-C_4)$-alkoxy;

$R^1$ is OH, $CH=CH_2$, $CH_2CH_2OR^2$, $CH_2CH_2NR^3R^4$ and $CH_2CH_2SR^5$, $R^2$ is H, $SO_3M$ or $(C_1-C_6)$-alkyl, which may be substituted by one or more, for example 1, 2 or 3, substituents selected from the group consisting of OH, $NH_2$, COOM and $SO_3M$;

$R^3$ and $R^4$ are independently H, $(C_1-C_6)$-alkyl, which may be substituted by one or more, for example 1, 2 or 3, substituents selected from the group consisting of OH, $NH_2$, COOM and $SO_3M$, $(C_1-C_6)$-acyl, $C_6-C_{10}$-aryl or halogen-substituted $C_6-C_{10}$-aryl;

$R^5$ is $(C_1-C_6)$-alkyl, which may be substituted by one or more, for example 1, 2 or 3, substituents selected from the group consisting of OH, $NH_2$, COOM and $SO_3M$, $(C_1-C_6)$-acyl, $C_6-C_{10}$-aryl or halogen-substituted $C_6-C_{10}$-aryl;

M1 is Cu, Co, Ni, Fe, Cr or ⅔ Al; and

M is hydrogen, a monovalent metal cation, one equivalent of a polyvalent metal cation or an ammonium ion which may be substituted by $(C_1-C_4)$-alkyl, $(C_1-C_4)$-alkoxyalkyl or hydroxy-$(C_1-C_4)$-alkyl.

M is preferably hydrogen, sodium or potassium.

M1 is preferably Cu.

The compound of the formula (2) where $SO_2R^1$ is meta to the azo linkage and Y is H and also where $R^1$ is β-sulfatoethyl and M1 is Cu, is known as C.I. Reactive Red 23.

DESCRIPTION OF THE PREFERRED EMBODIMENTS

Preference for the purposes of the present invention is given to a mixture of C.I. Acid Red 289 and C.I. Reactive Red 23.

Preferred mixing ratios, based on dry weights, are between 1:10 and 10:1, especially between 1:4 and 4:1.

The dye mixture of the invention may additionally contain a shading colorant, preferably selected from the group consisting of C.I. Direct Red 1, 11, 37, 62, 75, 81, 87, 89, 95, 227; C.I. Acid Red 1, 8, 52, 87, 94, 115, 131, 144, 152, 154, 186, 245 and 249; C.I. Pigment Red 122, 176, 184, 185 and 269. The shading colorant is preferably present in an amount of 0.001 to 5% by weight, especially 0.01 to 1% by weight, based on the dry weight of the total mixture.

A possible process for preparing the dye mixture of the invention comprises the dyes of the formulae (1) and (2) and optionally the shading colorant being mixed with each other in the stated mixing ratios, in powder form, in dissolved form, in the form of a water- or solvent-moist presscake or in the form of a masterbatch.

Dyes of the formula (2) are preparable as described in as yet unpublished German patent application 101 06 682.1.

The dyes may also be prepared by the continuous mixing of equivalent amounts of the starting materials in the form of aqueous acidic or aqueous alkaline solutions in for example mixing nozzles and continuous reactors with or without a supplementary reaction phase in a reaction vessel.

The present invention also provides for the use of the disclosed mixtures for dyeing and printing natural and synthetic fiber materials (e.g. polyester, silk, wool, blend fabrics), especially for recording script and images on various recording media, and also for coloring paper or celluloses in the pulp.

For use in recording fluids, the described dyes are worked up in a manner appropriate to the stated requirements. The dyes may be isolated from the initially obtained, preferably aqueous, reaction mixtures by salting out and filtration or by spray drying, optionally after partial or complete desalting by means of membrane filtration. However, it is also possible to dispense with any isolation and to convert the dye-containing reaction mixtures directly into concentrated dye solutions by addition of organic and/or inorganic bases, possibly humectants, preservatives and optionally after partial or complete desalting by means of membrane filtration. Alternatively, complex dyes may also be used as presscakes (including in flushing processes), where appropriate or as powders. Advantageously, the dye mixtures of the invention are used in substantially salt-free form, i.e., free of NaCl or other customary inorganic salts formed in the synthesis of the dyes.

Useful inorganic bases for concentrated dye solutions include for example lithium hydroxide, lithium carbonate, sodium hydroxide, sodium bicarbonate, sodium carbonate, potassium hydroxide, potassium carbonate and ammonia. Useful organic bases include for example monoethanolamine, diethanolamine, triethanolamine, 2-aminopropanol, 3-aminopropanol, dipropanolamine, tripropanolamine, N-methylaminoethanol, N,N-dimethylaminoethanol, N-phenylaminopropanol, ethylenediamine, tetramethylethylenediamine, tetramethylpropylenediamine, tetramethylhexylenediamine, diethylenetriamine, triethylenetetramine, triethylamine, diisopropylethylamine and polyethylenimine.

Useful humectants for concentrated dye solutions include for example formamide, urea, tetramethylurea, ε-caprolactam, ethylene glycol, diethylene glycol, triethylene glycol, polyethylene glycol, butylglycol, methylcellosolve, glycerol, N-methylpyrrolidone, 1,3-diethyl-2-imidazolidinone, sodium xylenesulfonate, sodium cumenesulfonate and sodium butylmonoglycol sulfate.

The dye mixtures of the invention are particularly useful for preparing recording fluids, especially aqueous and non-aqueous inks for the ink-jet printing process, and also for ink-jet inks which work according to the hot-melt process or are based on microemulsions, but also for other printing, duplicating, marking, writing, drawing, stamping or registering processes.

The present invention also provides recording fluids which contain a dye mixture according to the invention and optionally other colorants for shading. Such shading colorants are advantageously present in an amount of 0 to 20% by weight, preferably 0.01 to 10% by weight, especially 0.1 to 5% by weight, based on the total weight of the recording fluid. The composition of the recording fluid has to be adapted to the particular use.

Recording fluids according to the invention contain in general in total 0.1 to 50% by weight of said mixture of dyes (1) or (2) and, if present, of the shading colorant, reckoned as dry weight, 0 to 99% by weight of water and 0.5 to 99.5% by weight of organic solvent and/or humectant. In a preferred embodiment, the recording fluids contain 0.5 to 15% by weight of said dye mixture, reckoned as dry weight, 35 to 75% by weight of water and 10 to 50% by weight of organic solvent and/or humectant; in another preferred embodiment 0.5 to 15% by weight of said dye mixture, reckoned as dry weight, 0 to 20% by weight of water and 70 to 99.5% by weight of organic solvent and/or humectant.

Water used to prepare the recording fluids is preferably used in the form of distilled or demineralized water. The solvents and/or humectants in the recording fluids can be an organic solvent or a mixture of such a solvent, in which case water-miscible solvents are preferred. Useful solvents include for example mono- or polyhydric alcohols, their ethers and esters, e.g., methanol, ethanol, propanol, isopropanol, butanol, isobutanol; di- or trihydric alcohols, especially of 2 to 6 carbon atoms, e.g., ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol, polypropylene glycol; lower alkyl ethers of polyhydric alcohols, for example ethylene glycol mono-methyl, -ethyl or -butyl ether, triethylene glycol mono-methyl or -ethyl ether; ketones and ketone alcohols such as for example acetone, methyl ethyl ketone, diethyl ketone, methyl isobutyl ketone, methyl pentyl ketone, cyclopentanone, cyclohexanone, diacetone alcohol; amides, for example dimethylformamide, dimethylacetamide, N-methylpyrrolidone; also urea, tetramethylurea, thiodiglycol, ε-caprolactam.

The recording fluids of the invention may further contain customary additives, for example preservatives, cationic, anionic or nonionic surface-active substances (surfactants and wetting agents) and also viscosity regulators, for example polyvinyl alcohol, cellulose derivatives, or water-soluble natural or synthetic resins as film formers or binders to enhance the adhesion and abrasion resistance. They may further contain photostabilizers.

They may also contain amines, for example ethanolamine, diethanolamine, triethanolamine, N,N-dimethylethanolamine or diisopropylamine, to raise the pH of the recording fluid, normally at 0 to 10% by weight, preferably 0.5 to 5% by weight, based on the total weight of the recording fluid.

The recording fluids for the ink-jet printing process may have added to them, depending on the form of this printing process, for example as continuous jet, intermittent jet, pulsed jet or compound jet process, further additives, for example to buffer the pH, to adjust the electroconductivity, the specific heat, the thermal expansion coefficient and the conductivity. Recording fluids according to the invention in storage are not prone to the formation of precipitates that leads to fuzzy prints or nozzle cloggage.

The recording fluids of the invention have viscosity and surface tension values which are within the ranges suitable for the ink-jet processes. They provide prints of high optical density with excellent light- and waterfastness.

Furthermore, the magenta dye mixtures of the invention may be used as an ink set in combination with black, yellow and/or cyan recording fluids. The yellows and cyans involve not only dyes, for example C.I. Acid Yellow 17, C.I. Acid Yellow 23, C.I. Direct Yellow 86, C.I. Direct Yellow 98, C.I. Direct Yellow 132, C.I. Reactive Yellow 37, C.I. Acid Blue 9, C.I. Direct Blue 199, but also pigments, such as C.I. Pigment Yellow 17, C.I. Pigment Yellow 74, C.I. Pigment Yellow 83, C.I. Pigment Yellow 97, C.I. Pigment Yellow 120, C.I. Pigment Yellow 139, C.I. Pigment Yellow 151, C.I. Pigment Yellow 155, C.I. Pigment Yellow 180, C.I. Pigment Violet 19, C.I. Pigment Blue 15, C.I. Pigment Blue 15:3, C.I. Pigment Blue 15:4. The blacks are C.I. Food Black 1 and 2, C.I. Direct Black 168, C.I. Direct Black 195, C.I. Reactive Black 8, C.I. Reactive Black 31, C.I. Sol. Sulfur Black 1, Carbon Black. In the case of reactive dyes, even dyes which have been reacted with nucleophiles can be used in ink sets.

Moreover, the dye mixtures of the invention are useful as colorants in the electrophotographic toners and developers, for example one- and two-component powder toners, magnetic toners, liquid toners, polymerization toners and other specialty toners.

Typical toner binders are addition polymerization, polyaddition and polycondensation resins, such as styrene, styrene-acrylate, styrene-butadiene, acrylate, polyester, phenolic and epoxy resins, polysulfones, polyurethanes, individually or in combination, and also polyethylene and polypropylene, in or to which further ingredients, such as charge control agents, waxes or flow agents, may be present or added subsequently. Dye mixtures according to the invention are further useful as colorants in powders and powder coating materials, especially triboelectrically or electrostatically sprayed powder coating materials, which are used to coat the surfaces of articles made for example of metal, wood, plastic, glass, ceramic, concrete, textile material, paper or rubber. Powder coating resins employed are typically epoxy resins, carboxyl- and hydroxyl-containing polyester resins, polyurethane resins and acrylic resins together with customary curing agents. Combinations of resins are also used. For instance, epoxy resins are frequently used in combination with carboxyl- and hydroxyl-containing polyester resins.

The dye mixtures of the invention are also useful as colorants for color filters, for additive as well as subtractive color generation (P. Gregory "Topics in Applied Chemistry: High Technology Applications of Organic Colorants" Plenum Press, New York 1991, page 15–25), and also as colorants in electronic inks for electronic newspapers.

In the above-described application areas too, the mixtures of the dyes (1) and (2) may be additionally shaded with other dyes and/or pigments, for example with C.I. Direct Red 1, 11, 37, 62, 75, 81, 87, 89, 95 and 227; C.I. Acid Red 1, 8, 52, 87, 94, 115, 131, 144, 152, 154, 186, 245 and 249; C.I. Pigment Red 122, 57:1, 146, 176, 184, 185 and 269.

In the examples which follow, the lightfastness is determined according to DIN 54003 (blue wool scale). 1 is very low, 2 is low, 3 is moderate, 4 is fairly good, 5 is good, 6 is very good.

EXAMPLES

Example 1

Preparation of Dye (2)

a) Diazotization of Amine Component (3)

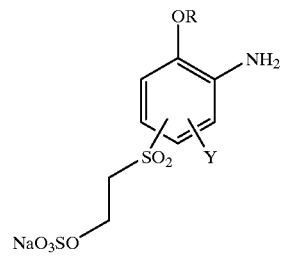

(3)

16.67 g (0.05 mol) of amine component (3) (R=methyl; Y=hydrogen) are introduced into 20 ml of 10N hydrochloric acid, admixed with 20 ml of salt-free water and stirred for 30 min. The temperature is then adjusted to 0–5° C. with 20 g of ice, 3.62 g of sodium nitrite are added over 1.5 hours, and the batch is stirred at 5–8° C. for 3 hours. The excess of nitrite is removed with amidosulfonic acid.

b) Coupling to Form Monoazo Dye (5)

17.41 g (0.05 mol) of coupling component (4)

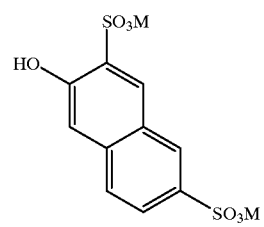

(4)

(M=Na) are suspended in 60 ml of salt-free water, adjusted to pH 6–9 with 10N aqueous sodium hydroxide solution and admixed with 25 g of ice. This solution is admixed (by dropwise addition) with the reaction mixture prepared under a), pH-controlled with sodium carbonate and stirred until conversion is quantitative (TLC). Alternatively, the coupling component may also be added dropwise to the diazo solution, or the two reactants may be continuously mixed together in the requisite molar ratios.

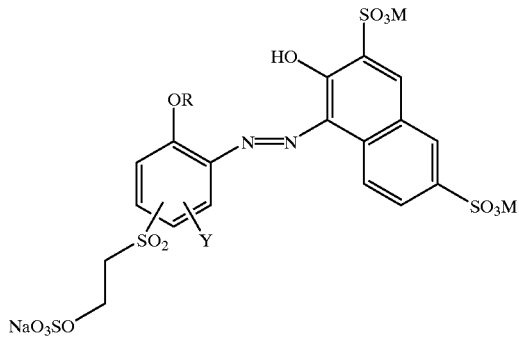

(5)

c) Demethylating Coppering

The dye solution obtained in b) is adjusted to pH 3–5 with 10N hydrochloric acid, admixed with 12.98 g (0.052 mol) of copper sulfate×5H$_2$O and with 11.3 g of sodium acetate and stirred at 95° C. for 48 hours. After cooling to room temperature, the reaction solution is admixed with sodium thiosulfate×5H$_2$O and stirred at 90° C. for 4 hours. The dye solution is then filtered.

Alternatively, the metallization may also be carried out in a pressure reactor or by the process described in example 2d).

d) Reaction with Taurine 18.78 g (0.15 mol) of taurine, dissolved in 50 ml of demineralized water, are added to the dye solution. The pH is then adjusted to 9–10 with 10N aqueous sodium hydroxide solution, and the batch is heated at 60° C. for 30 min to obtain the dye (2) in dissolved form.

Example 2

Preparation of Dye (2) by Alternative Process a) Reaction of Amine (3) with Taurine 16.67 g (0.05 mol) of amine component (3) where R=methyl and Y=H, are dissolved in 50 ml of demineralized water and admixed at pH 8.5–10 with 6.88 g (0.055 mol) of taurine. The temperature is raised to 60° C. for 1 hour.

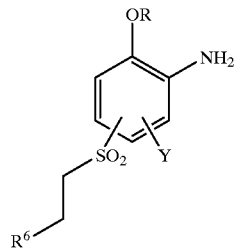

(7)

b) Diazotization of Amine Component (7)

The reaction solution obtained under a) is admixed with 25 ml of 10N hydrochloric acid and 20 ml of water. After stirring for 30 minutes, 25 g of ice are added to cool to 0–5° C., followed by 3.62 g of sodium nitrite over 1.5 hours. The batch is stirred at 5–8° C. for 3 hours, and then the excess nitrite is removed with amidosulfonic acid.

c) Coupling to form Monoazo Dye (8)

17.41 g (0.05 mol) of coupling component (4) (M=Na) are suspended in 60 ml of salt-free water, adjusted to pH 6=9 with 10N aqueous sodium hydroxide solution and admixed with 25 g of ice. This solution is admixed (by dropwise addition) with the reaction mixture prepared under b), pH-controlled with sodium carbonate and stirred until conversion is complete (TLC). Alternatively, the coupling component may also be added dropwise to the diazonium salt solution.

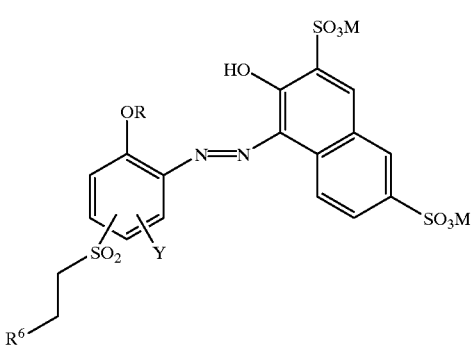

(8)

d) Demethylating Coppering 12.98 g (0.052 mol) of copper sulfate×5H$_2$O are dissolved in 20 ml of demineralized water, admixed with 20.8 ml of ammonium (25% strength) and heated at 60° C. for 10 min. The dye solution obtained from c) is admixed with 12.3 g (0.117 mol) of diethanolamine (99% strength), followed by the copper complex solution. This is followed by heating at 90° C. for 3 hours at pH 9–10 and TLC monitoring of the conversion. The excess ionic copper is removed by addition of sodium thiosulfate×5H$_2$O and heating to 90° C. for 4 hours by subsequent filtration.

Example 3

Preparation of a Recording Fluid

A 10% by weight salt-free aqueous solution is prepared for each of C.I. Reactive Red 23 and C.I. Acid Red 289.

1500 ml of the Reactive Red 23 solution are then mixed at room temperature with 498 ml of the Acid Red 289 solution. 2 ml of a 1% by weight C.I. Acid Red 52 solution are mixed in for shading. The dye solution thus obtained is preserved with 4 g of ®Proxel GXL.

Absorption spectrum in water: $\lambda_{max}$=524 nm; Lightfastness: 5 (blue wool scale) Storage stability test: no solid particles after 4 weeks at 50° C. and 10 days at −20° C.; Surface tension: >50 mN/m (5% strength aqueous ink).

Example 4

Preparation of a Recording Fluid 2000 ml of a 10% by weight salt-free solution of C.I. Reactive Red 23 are mixed with 498 ml of a likewise demineralized 10% by weight solution of C.I. Acid Red 289. 2 ml of a 1% by weight C.I. Reactive Red 180 solution are mixed in as shading component. 0.2% by volume of ®Mergal K10 N is added to preserve the dye solution.

Lightfastness: 5; Storage stability: no solid particles after 4 weeks at 50° C. and 10 days at −20° C.

Example 5

Preparation of a Recording Fluid 1000 ml of a 10% by weight salt-free solution of a Reactive Red 23 derivative of the formula (2) where $R^1$ is $CH_2CH_2NHCH_2CH_2SO_3M$ are admixed with 498 ml of a likewise desalted 10% by weight solution of C.I. Acid red 289. The pH of the solution is adjusted to 3.5–4.5. The dye solution is preserved with 4 g of Proxel GXL.

Lightfastness: 5; Storage stability: no solid particles after 4 weeks at 50° C. and 10 days at −20° C.

Example 6

Example of the Preparation of a Recording Fluid having a Pure dye Content of 2.5% by Weight 2.5 g of desalted pure dye obtained by drying the dye solution prepared in example 1d) are introduced with stirring at 25° C. with a mixture of 20.0 g of diethylene glycol, 2.5 g of N-methylpyrrolidone, 1.0 g of triethanolamine and 76.5 g of desalted water and dissolved.

The ink thus prepared provides brilliant magenta prints having very good lightfastness.

Lightfastness: 5 (blue wool scale) UV-VIS: $\delta_{max}$=531 nm

What is claimed is:

1. A dye mixture consisting essentially of C.I. Acid Red 289 of the formula (1) and a compound of the formula (2) in a weight ratio of 1:100 to 100:1

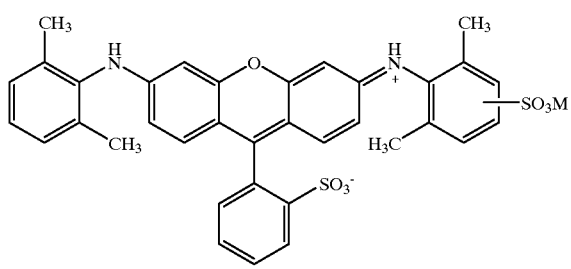

(1)

-continued

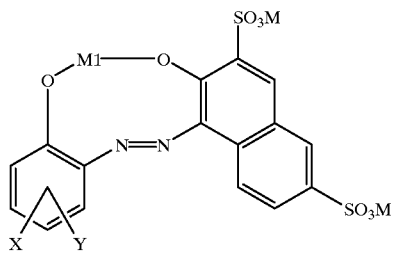

(2)

where
  X is $SO_2R^1$;
  Y is H, alkyl, alkoxy;
  $R^1$ is OH, $CH=CH_2$, $CH_2CH_2OR^2$, $CH_2CH_2NR^3R^4$ and $CH_2CH_2SR^5$;
  $R^2$ is H, $SO_3M$ or $(C_1-C_6)$-alkyl, which is optionally substituted by one or more substituents selected from the group consisting of OH, $NH_2$, COOM and $SO_3M$;
  $R^3$ and $R^4$ are independently H, $(C_1-C_6)$-alkyl, which is optionally substituted by one or more substituents selected from the group consisting of OH, $NH_2$, COOM and $SO_3M$;
  $(C_1-C_6)$-acyl, $C_6-C_{10}$-aryl or halogen-substituted $C_6-C_{10}$-aryl;
  $R^5$ is $(C_1-C_6)$-alkyl, which is optionally substituted by one or more substituents selected from the group consisting of OH, $NH_2$, COOM and $SO_3M$;
  $(C_1-C_6)$-acyl, $C_6-C_{10}$-aryl or halogen-substituted $C_6-C_{10}$-aryl;
  M1 is Cu, Co, Ni, Fe, Cr or ⅔ Al; and
  M is hydrogen, a monovalent metal cation, one equivalent of a polyvalent metal cation or an ammonium ion which is optionally substituted by $(C_1-C_4)$-alkyl, $(C_1-C_4)$-alkoxyalkyl or hydroxy-$(C_1-C_4)$-alkyl.

2. A dye mixture as claimed in claim 1, wherein the mixing ratio is between 1:10 and 10:1.

3. A dye mixture as claimed in claim 1, wherein $R^1$ is β-sulfatoethyl and M1 is Cu.

4. A dye mixture as claimed in claim 1, containing a shading colorant selected from the group consisting of C.I. Direct Red 1, 11, 37, 62, 75, 81, 87, 89, 95, 227;
  C.I. Acid Red 1, 8, 52, 87, 94, 115, 131, 144, 152, 154, 186, 245, 249;
  C.I. Pigment Red 122, 176, 184, 185 and 269.

5. A dye mixture as claimed in claim 4, wherein the shading colorant is present in an amount of 0.001 to 5% by weight.

6. A dye mixture as claimed in claim 4, wherein the shading colorant is present in an amount of 0.01 to 1% by weight, based on the total weight of the dry dye mixture.

7. A process for preparing a dye mixture as claimed in claim 1, which comprises the dyes of the formulae (1) and (2) and optionally the shading colorant being mixed with each other in powder form, in dissolved form, in the form of a water- or solvent-moist presscake or in the form of a masterbatch.

8. A method for dyeing and printing natural and synthetic fiber materials, for recording script and images on recording media, and for coloring paper or celluloses in the pulp, comprising the step of adding a dye mixture as claimed in claim 1 to said fiber material, recording media or pulp to be dyed.

9. The method of claim 8, wherein the recording media are electrophotographic toners and developers or inks.

10. A recording fluid containing a dye mixture as claimed in claim 1.

11. A recording fluid as claimed in claim 10, containing essentially 0.1 to 50% by weight of the dye mixture of claim 1 and also 0 to 99% by weight of water and 0.5 to 99.5% by weight of organic solvent and/or humectant.

12. A recording fluid as claimed in claim 10, containing a shading colorant selected from the group consisting of C.I. Direct Red 1, 11, 37, 62, 75, 81, 87, 89, 95, 227;

C.I. Acid Red 1, 8, 52, 87, 94, 115, 131, 144, 152, 154, 186, 245, 249;

C.I. Pigment Red 122, 176, 184, 185 and 269.

13. A recording fluid as claimed in claim 12, wherein the shading colorant is present in an amount of 0.01 to 10% by weight based on the total weight of the recording fluid.

14. A recording fluid as claimed in claim 10, containing essentially 0.5 to 15% by weight of the dye mixture and, if used, of the shading colorant, 35 to 75% by weight of water and 10 to 50% by weight of organic solvent and/or humectant.

15. A recording fluid as claimed in claim 10, containing essentially 0.5 to 15% by weight of the dye mixture and, if used, of the shading colorant, 0 to 20% by weight of water and 70 to 99.5% by weight of organic solvent and/or humectant.

16. A recording fluid as claimed in claim 10, wherein the dye mixture is used in desalted form.

17. A recording fluid as claimed in claim 16, wherein the recording fluid is an ink-jet ink.

18. An ink set comprising a magenta recording fluid as claimed in claim 10, a black recording fluid, a yellow recording fluid and/or a cyan recording fluid.

* * * * *